United States Patent
Song

(10) Patent No.: US 11,284,161 B2
(45) Date of Patent: Mar. 22, 2022

(54) METHOD AND DEVICE FOR LOADING ELECTRONIC PROGRAM GUIDE, AND NON-TRANSITORY STORAGE MEDIUM

(71) Applicant: BEIJING XIAOMI MOBILE SOFTWARE CO., LTD., Beijing (CN)

(72) Inventor: Wenju Song, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/990,849

(22) Filed: Aug. 11, 2020

(65) Prior Publication Data

US 2021/0306709 A1    Sep. 30, 2021

(30) Foreign Application Priority Data

Mar. 31, 2020    (CN) .......................... 202010246802.6

(51) Int. Cl.
*H04N 21/482*    (2011.01)
*H04N 21/45*    (2011.01)

(52) U.S. Cl.
CPC ....... *H04N 21/482* (2013.01); *H04N 21/4508* (2013.01)

(58) Field of Classification Search
CPC .. H04N 21/482; H04N 21/4821; H04N 21/47; H04N 21/4532; H04N 21/4314; H04N 21/4312; H04N 21/4221
See application file for complete search history.

(56) References Cited

U.S. PATENT DOCUMENTS

| 4,706,121 A | * | 11/1987 | Young | ............... H04N 7/0887 348/27 |
| 5,929,840 A | * | 7/1999 | Brewer | ............... G06F 3/04812 715/862 |
| 6,128,009 A | | 10/2000 | Ohkura et al. | |
| 6,415,437 B1 | * | 7/2002 | Ludvig | ............... H04N 21/84 725/41 |

(Continued)

FOREIGN PATENT DOCUMENTS

| CN | 101577797 A | 11/2009 |
| CN | 101764974 A | 6/2010 |

(Continued)

OTHER PUBLICATIONS

Extended European Search Report in the European Application No. 20193248.0, dated Nov. 17, 2020, (10p).

(Continued)

*Primary Examiner* — Jason Salce
(74) *Attorney, Agent, or Firm* — Arch & lake LLP

(57) ABSTRACT

The disclosure relates to a method and device for loading an electronic program guide (EPG), and a storage medium. The device determines a first area where a focus is located on a display interface of an EPG, where the first area is one of multiple functional display areas of the EPG. The device determines whether a focus cross-area jump condition is satisfied in response to detecting a moving instruction for moving the focus on the display interface of the EPG. The device limits the focus to move within the first area in response to determining that the focus cross-area jump condition is not satisfied.

20 Claims, 4 Drawing Sheets

(56) References Cited

U.S. PATENT DOCUMENTS

| | | | |
|---|---|---|---|
| 6,505,348 B1* | 1/2003 | Knowles | H04N 21/4753 |
| | | | 725/49 |
| 8,615,779 B2 | 12/2013 | Migos et al. | |
| 10,567,829 B2 | 2/2020 | Kleinerman et al. | |
| 2002/0073424 A1 | 6/2002 | Ward, III et al. | |
| 2002/0078467 A1* | 6/2002 | Rosin | H04N 21/8586 |
| | | | 725/110 |
| 2005/0010949 A1 | 1/2005 | Ward et al. | |
| 2007/0016926 A1 | 1/2007 | Ward et al. | |
| 2007/0033613 A1 | 2/2007 | Ward, III et al. | |
| 2007/0186240 A1 | 8/2007 | Ward, III et al. | |
| 2008/0127262 A1* | 5/2008 | Neufeld | H04N 21/4826 |
| | | | 725/40 |
| 2008/0127265 A1 | 5/2008 | Ward et al. | |
| 2008/0127266 A1 | 5/2008 | Ward et al. | |
| 2009/0089835 A1 | 4/2009 | Watanabe et al. | |
| 2011/0035770 A1 | 2/2011 | Ward, III et al. | |
| 2011/0035771 A1 | 2/2011 | Ward, III et al. | |
| 2014/0123191 A1* | 5/2014 | Hahn | H04N 21/482 |
| | | | 725/41 |
| 2015/0193138 A1* | 7/2015 | Relyea | G06F 3/0482 |
| | | | 725/52 |
| 2015/0237391 A1 | 8/2015 | Tsuji | |
| 2015/0373518 A1* | 12/2015 | DiFrancesco | H04W 4/14 |
| | | | 455/404.1 |

FOREIGN PATENT DOCUMENTS

| | | |
|---|---|---|
| CN | 108200464 A | 6/2018 |
| CN | 108449624 A | 8/2018 |
| CN | 108810647 A | 11/2018 |
| CN | 109218805 A | 1/2019 |
| EP | 2112824 A2 | 10/2009 |
| EP | 2908545 A1 | 8/2015 |
| WO | 2014028811 A1 | 2/2014 |

OTHER PUBLICATIONS

First Office Action of the Chinese Application No. 202010246802.6, dated Sep. 24, 2021 with English translation, (12p).

Author: Ni Nan, Title: Design and Implementation of the EPG Portal in IPTV System, Hebei Normal University, Mar. 15, 2014, (58p).

* cited by examiner

METHOD AND DEVICE FOR LOADING ELECTRONIC PROGRAM GUIDE, AND NON-TRANSITORY STORAGE MEDIUM

CROSS-REFERENCE TO RELATED APPLICATION

This application claims priority to Chinese Patent Application No. 202010246802.6, filed on Mar. 31, 2020, the disclosure of which is hereby incorporated by reference in its entirety for all purposes.

TECHNICAL FIELD

The disclosure relates to the technical field of smart televisions, and particularly relates to a method and device for loading an electronic program guide (EPG), and a storage medium.

BACKGROUND

The EPG displayed on a screen of a smart television (i.e., smart TV) is used for displaying the current and upcoming program lists to be broadcast on the smart television. The EPG provides a user with easy use, friendly interface and quick access to the programs of interest.

Generally, a user interface of the EPG is arranged in a matrix form to display a broadcast program area and a channel area. The program corresponding to a channel in the broadcast program area is displayed in a size proportional to a duration of the program. The user interface also includes a favorite area to facilitate the user to collect favorite channels. However, when the user moves a focus within a certain area, there is a possibility that the focus will jump into another area, resulting in poor user experience.

SUMMARY

The disclosure provides a method and device for loading an EPG, and a non-transitory storage medium.

According to a first aspect of the disclosure, a method for loading an EPG is provided. The method includes: a first area where a focus is located on a display interface of an EPG is determined, where the first area is one of multiple functional display areas of the EPG; whether a focus cross-area jump condition is satisfied is determined in response to detecting a moving instruction for the focus; and the focus is limited to move within the first area when the focus cross-area jump condition is not satisfied.

According to a second aspect of the disclosure, a device for loading an EPG is provided. The device for loading the EPG includes: one or more processors, and a memory configured to store instructions executable by the one or more processors. The one or more processors are configured to: determine a first area where a focus is located on a display interface of an EPG, where the first area is one of multiple functional display areas of the EPG; determine whether a focus cross-area jump condition is satisfied in response to detecting a moving instruction for the focus; and limit the focus to move within the first area in response to determining that the focus cross-area jump condition is not satisfied.

According to a third aspect of the disclosure, a non-transitory storage medium is provided. When instructions in the storage medium are executed by a processor of a computer, the computer may perform the method for loading the EPG described in the first aspect.

It should be understood that the above general description and the following detailed description are exemplary and explanatory only, and are not intended to limit the disclosure.

BRIEF DESCRIPTION OF THE DRAWINGS

The drawings herein, which are incorporated in and constitute a part of the description, illustrate embodiments consistent with the disclosure, and explain the principles of the disclosure together with the description.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Rather, they are merely examples of devices and methods consistent with some aspects of the disclosure as detailed in the appended claims.

Figure 1:
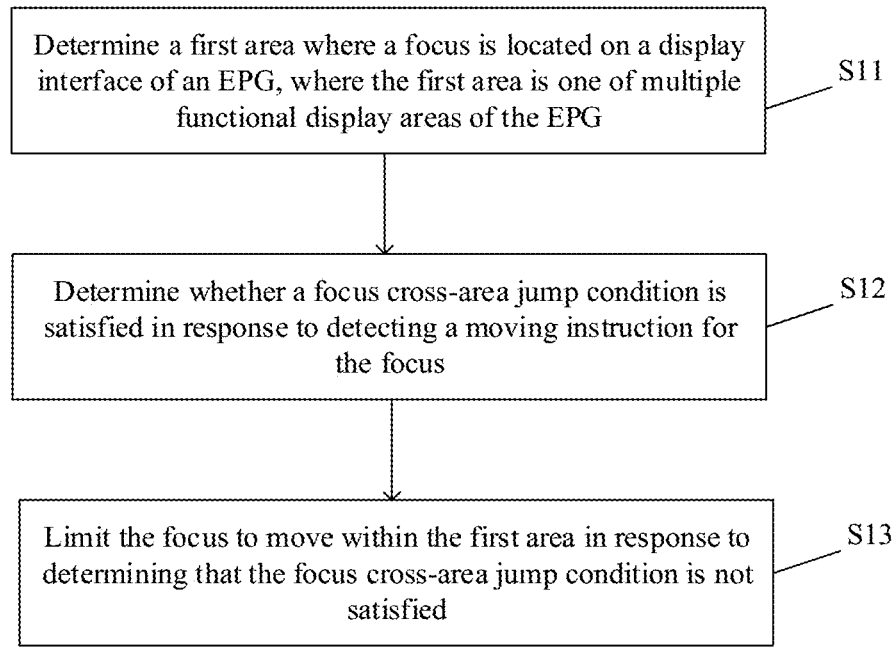
FIG. 1 is a flowchart of a method for loading an EPG according to an embodiment of the disclosure.

FIG. 1 is a flowchart of a method for loading an EPG according to an embodiment of the disclosure. As illustrated in FIG. 1, the method for loading an EPG includes the following operations:

In S11, a first area where a focus is located on a display interface of an EPG is determined, where the first area is one of multiple functional display areas of the EPG;

In S12, whether a focus cross-area jump condition is satisfied is determined in response to detecting a moving instruction for the focus; and In S13, the focus is limited to move within the first area in response to determining that the focus cross-area jump condition is not satisfied.

In some embodiments of the disclosure, the method for loading an EPG is applied to a television which includes, but is not limited to, a smart TV. As mentioned above, when the smart TV loads the EPG, the multiple functional display areas of the EPG include a channel area composed of channel data, a program area composed of program data, and a favorite area. The smart TV may receive a moving instruction for moving the focus from a user using a control device, where the control device may be a remote controller, a smart phone, or any other smart device in communication with the smart TV.

The channel data refers to data of a channel, such as one or more of a channel number identification, a channel icon identification and a channel holder.

The program data includes data of programs expected to be broadcast on one or more channels, such as at least one of a program name, a program type, or a program content introduction.

Channel data and program data are displayed in the form of controls to facilitate a user to select a desired channel and program.

In addition, the favorite area may include data for collecting channel data of the channel area selected by the user, or program data of the program area. For example, the favorite data in the favorite area does not identify any information, but different shapes may be configured to collect data for different areas. The favorite data is also displayed in a form of a control. A favorite control for collection in the channel area may be positioned at the left side of the channel area, and one favorite control corresponds to one channel control. A favorite control for collection in the program area may be positioned at the upper side of the program area, and one favorite control corresponds to a time zone in the program area.

Figure 2:
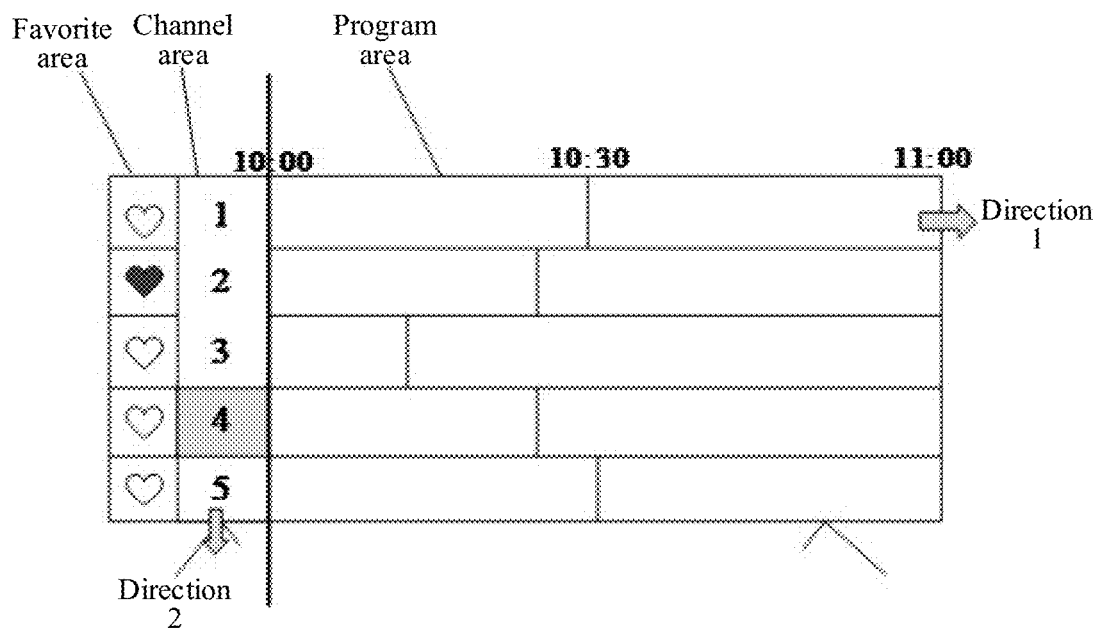
FIG. 2 is a first schematic diagram of an interface of an EPG.

FIG. 2 is a first schematic diagram of an interface of an EPG. As illustrated in FIG. 2, with a vertical line as a boundary line, the left side of the interface includes a channel area and a favorite area, and the right side of the interface corresponds to the program area. The program data in the program area is dynamically loaded according to time zones, such as 10 to 11 o'clock, and 11 to 12 o'clock. Only one focus exists on the current interface and is located on the control of a channel "4".

It should be noted that in the embodiments of the disclosure, the focus control is a control selected by the focus. The control selected by the focus is in an activated state. When a confirmation operation for the control selected by the focus is received, it can respond to the operation corresponding to the control selected by the focus. The control not selected by the focus is in an inactivated state and will not respond to the corresponding confirmation operation. The focus control will be displayed in a color or brightness different from that of other controls, or in a dynamically changing manner. Furthermore, in the embodiments of the disclosure, the time zone refers to a time zone of the home of the channel where the program data is located.

Generally, the path of the focus has certain rules. First Rule: the focus may not jump to the channel area when browsing the program controls in the program area upward, downward and rightward, and the focus may only reach the channel area when leftward reaching the first time zone, where the first time zone may be Beijing time "0:00 to 1:00". Second Rule: when the channel controls of the channel area are browsed upward and downward, the focus may not jump to the favorite control in the favorite area. For the favorite area, similar to the channel area, when the favorite controls in the favorite area are browsed upward and downward, the focus may not jump to the program control or the channel control.

However, when a user switches a control, for example, in a first direction illustrated in FIG. 2, the focus will jump to a favorite control in the favorite area at the leftmost side, which violates the first rule. The reason is that: the data of the next time zone adjacent to "10:30 to 11:00" needs to be loaded at this time and the program control in the program area needs to be redrawn, when the program control has not been drawn, the focus will be removed from the old control, and the focus without a carrier will be assigned to the favorite control at the upper left corner of the display interface.

In a second direction illustrated in FIG. 2, when the user switches a control, the focus will jump to the program area at the right side or the favorite control at the upper left corner. The reason is that: at this time, the next channel control adjacent to a channel "5" in the channel area has not been drawn, so the focus will be removed from the old control, and the focus without a carrier will be assigned to the favorite control at the upper left corner of the display interface or the program control in the program area at the right side.

It can be seen that there is a problem of focus jump. In order to solve the problem of focus jump, the movement of the focus is limited within an original first area in the disclosure. The first area may be a channel area, a program area or a favorite area. In the embodiments of the disclosure, a channel area or a program area is taken as a first area for description.

In S11, a first area where a focus is located on a display interface of an EPG is determined, and in S12, whether a focus cross-area jump condition is satisfied is determined in response to detecting a moving instruction for the focus.

In the embodiments of the disclosure, a television may receive a moving instruction for the focus sent by a user using a remote controller, such as an instruction for upward, downward, leftward or rightward moving the currently selected control on the display interface, sent by the remote controller. Or, when the television is in a projection state, the television may also receive a moving instruction for the focus sent by the user based on the screen operation of a control device. For example, a mobile phone receives an instruction sent by the user for upward, downward, leftward or rightward sliding a touch screen, and sends the instruction to the television. It should be noted that the instruction of upward sliding received by the mobile phone may correspond to the moving instruction for upward moving the focus; the instruction of downward sliding may correspond to the moving instruction for downward moving the focus; the instruction of leftward sliding may correspond to the moving instruction for leftward moving the focus; and the instruction of rightward sliding may correspond to the moving instruction for rightward moving the focus.

Of course, if the television or the control device supports voice control, the moving instruction for the focus may also be obtained by means of voice. The disclosure does not limit the detection manner of the moving instruction.

When the television detects the moving instruction for the focus, it will determine whether the movement of the focus satisfies the focus cross-area jump condition.

Taking a program area as a first area as an example, as mentioned above, the focus may reach the channel area only when leftward reaching the first time zone in the program area. Therefore, if the current focus is located on the program control in the first time zone and a leftward focus moving instruction is detected, the focus cross-area jump condition is satisfied; otherwise, the focus cross-area jump condition is not satisfied.

Taking a channel area as a first area as an example, as mentioned above, when the channel controls in the channel area are browsed upward and downward, the focus may not jump to the favorite control in the favorite area. Therefore, if the current focus is located on the channel control, when an upward or downward focus moving instruction is detected, the focus cross-area jump condition is not satisfied; and when a leftward or rightward focus moving instruction is detected, the focus cross-area jump condition is satisfied.

In S13, the focus is limited to move within the first area in response to determining that the focus cross-area jump condition is not satisfied.

In some cases, there is a manner of simulating a focus. The manner of simulating a focus is to virtualize a focus in an area where the focus is located. In the process of virtualizing a focus, there are three steps: (1) the width and height of a control are calculated; (2) the position of a virtual focus is determined; and (3) the control is drawn and displayed in a color or brightness different from that of other controls.

It can be seen that the processing of simulating the focus is complicated. In addition, the manner of simulating the focus is not easy to expand. For example, in the program area, the focus may be simulated according to the ratio of the program duration. During drawing in the channel area, in order to simulate the control in the channel area or the favorite area, it is necessary to call the shape information, size information and the like of the control in the channel area or the favorite area, so that the process is complicated, and a non-rectangular control is also difficult to draw.

It can be understood that in the disclosure, when a moving instruction for the focus is detected or received, whether a focus cross-area jump condition is satisfied is determined first. And when the focus cross-area jump condition is not satisfied, the focus is limited to move within the first area. That is, the focus may be limited not to jump into an area other than the first area, thereby prevent the problem of focus jump and improving the use experience. Furthermore, in the disclosure, since the focus is limited to move within the first area, it only needs to wait for completion of loading of the control to be captured, and then, the control is displayed in a form of the focus control. Compared with the manner of simulating a focus, this solution is simpler and more effective.

In one or more embodiments, the operation of limiting the focus to move within the first area includes:

a second area is set to a disabled state, where the second area in the disabled state may not obtain the focus, and the second area is an area other than the first area in the display interface of the EPG.

In the present embodiment, the second area is an area other than the first area in the display interface of the EPG. For example, if the first area is the channel area, an area other than the first area may be the program area or the favorite area; if the first area is the program area, an area other than the first area may be the channel area or the favorite area; and if the first area is the favorite area, an area other than the first area may be the channel area or the program area. In addition, an area other than the first area also includes portions that do not belong to the EPG on the display interface, such as an instruction area.

In the present embodiment, when determining that the focus is located in the first area, when the cross-area jump condition is not satisfied, a state in which a second area obtains the focus may be set to a disabled state, that is, the capability of the second area for capturing the focus is disabled. For example, when a processor of a display device determines that the focus is in the first area of the current page, a state in which an area other than the first area obtains the focus is set to be a "false" state. In the "false" state, the second area may not obtain the focus.

Figure 3:
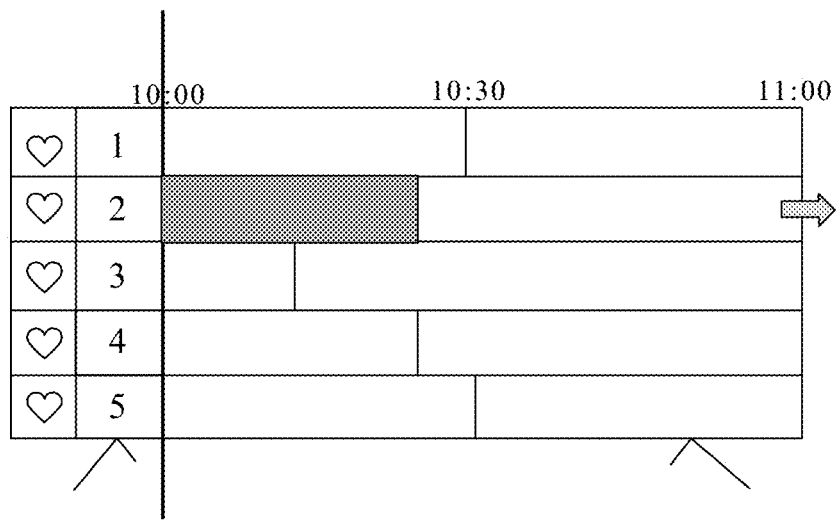
FIG. 3 is a second schematic diagram of an interface of an EPG.

FIG. 3 is a second schematic diagram of an interface of an EPG. As illustrated in FIG. 3, the focus is currently located on the program data corresponding to the channel "2" in the time zone "10:00 to 10:30", that is, the focus is located in the program area. At this time, since the current display interface is not the interface including the first time zone, no matter where the focus is in the program area of the current display interface, it will not jump into the channel area.

It can be understood that by means of this manner, the problem that the focus jumps into the second area may be effectively relieved. In addition, even if the focus is lost, it will not jump into the second area. For example, when the focus is located in the program area and the program data in the program area may not be generated due to the loss of a channel signal, that is, a control in the program area is lost, when a moving instruction for the focus moving to the lost control is detected, the focus may not jump to the channel area.

In one or more embodiments, the operation of limiting the focus to move within the first area includes:

the current page of the first area is switched from the first page to the second page when the moving instruction instructs the focus to move from the current page of the first area to the outside of the boundary of the current page; and the position of the focus in the second page is determined.

In the present embodiment, the display device will detect the moving instruction for the focus. When the moving instruction instructs the focus to move from the current first page of the first area to the outside of the boundary of the first page, the current first page of the first area is switched to the second page. It should be noted that the second page also belongs to the first area. In addition, the moving instruction instructs the focus to move from the current first page of the first area to the outside of the boundary of the first page. At this time, the focus in the first page is already located at the boundary of the current page. Therefore, when a moving instruction pointing to the outside of the boundary is detected, the page will be switched.

In an example, if the first area is the program area, the first page and the second page are pages including program data in different time zones. In another example, if the first area is the channel area, the first page and the second page are pages including different channel data.

In addition, in the embodiments of the disclosure, the boundary of the current page refers to the position of the first row, the last row, the first column, or the last column of the current page. For example, for the program area, the boundary of the current page refers to the first column or the last column of the current program data page; and for the channel area, the boundary of the current page refers to the first row or the last row of the current channel data page.

Figure 4:
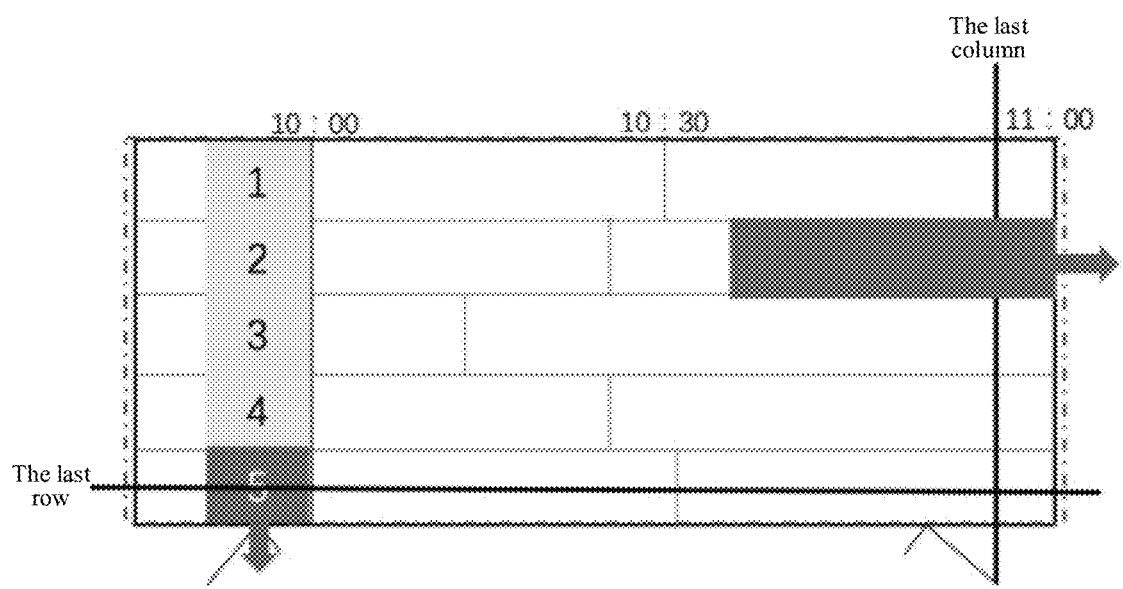
FIG. 4 is a third schematic diagram of an interface of an EPG.

FIG. 4 is a third schematic diagram of an interface of an EPG. As illustrated in FIG. 4, in the current page, the last row where the channel data is located belongs to the boundary of the current page, and the last column where the program data is located also belongs to the boundary of the current page.

After the television switches the current first page of the first area to the second page, the position of the focus may be determined in the second page. It can be understood that the position of the focus, determined in the second page, still belongs to the first area, thereby effectively relieving the condition that the focus jumps into an area other than the first area.

In one or more embodiments, the method further includes that:

a target focus position is captured in the first page according to the position of the focus in the first page and the focus moving direction indicated by the moving instruction; and it is determined that the moving instruction instructs the focus to move from the current page of the first area to the outside of the boundary of the current page in response to that no target focus position is captured in the first page.

In the present embodiment, after a moving instruction for the focus is received, a target focus position may be captured in the first page according to the position of the focus in the current first page and the focus moving direction indicated by the moving instruction; when no target focus position is captured in the first page, it is determined that the focus is at the boundary of the first page. The moving instruction indicates that the focus is moved from the current first page of the first area to the outside of the boundary of the current first page.

Figure 5:
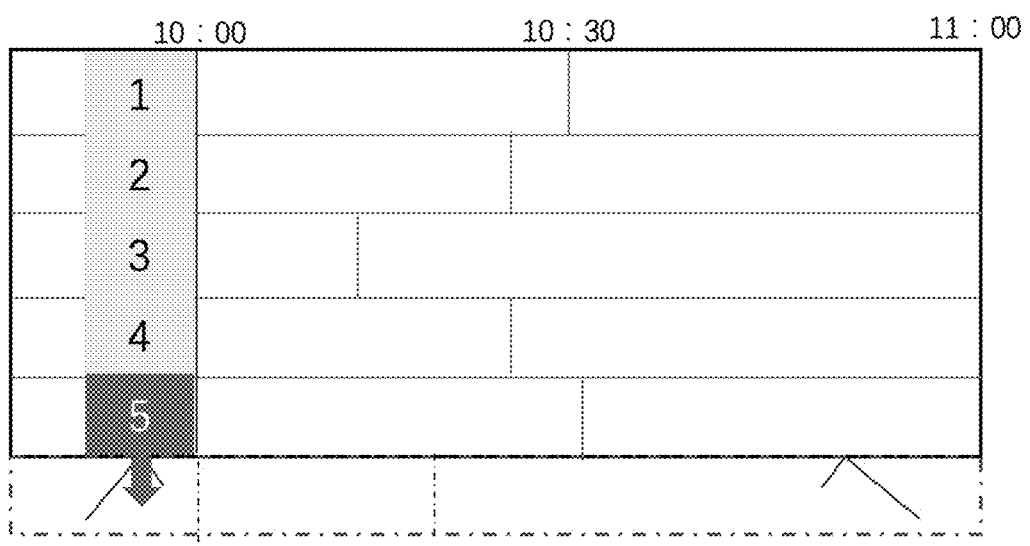
FIG. 5 is a fourth schematic diagram of an interface of an EPG.

FIG. 5 is a fourth schematic diagram of an interface of an EPG. As illustrated in FIG. 5, the focus is located at the last row in the current first page of the channel area, so when a moving instruction for downward moving the focus is detected, the focus may not be captured in the current first page. Therefore, it can be determined that the moving instruction instructs the focus to move from the current page of the first area to the outside of the boundary of the current page.

In one or more embodiments, the operation of switching the current page of the first area from the first page to the second page when the moving instruction instructs the focus to move from the current page of the first area to the outside of the boundary of the current page includes:

whether the first page is the first end page in the focus moving direction indicated by the moving instruction is determined when the moving instruction instructs the focus to move from the current page of the first area to the outside of the boundary of the current page;

the first page is switched to a second end page in an opposite direction of the focus moving direction in response to determining that the first page is the first end page in the focus moving direction; and the first page is switched to a next page adjacent to the first page in the focus moving direction in response to determining that the first page is not the first end page in the focus moving direction.

In the embodiment, in a case that the moving instruction instructs the focus to move from the current first page of the first area to the outside of the boundary of the current first page, it will first determine whether the first page is the last page in the focus moving direction indicated by the moving instruction. When it is determined that the first page is the last page in the focus moving direction, the first page is switched to the second page, and the second page refers to a last page in an opposite direction of the focus moving direction; and when the first page is not the last page in the focus moving direction, the first page is switched to a next page adjacent to the first page in the focus moving direction. Here, the last page in the focus moving direction may be referred as the first end page while the last page in an opposite direction of the focus moving direction may be referred as the second end page.

In the embodiment, taking a program area as a first area as an example, the first page which is the last page in the focus moving direction refers to a page where the program data in the latest time zone among all program data is located; the last page in the opposite direction of the focus moving direction refers to a page where the program data in the earliest time zone among all program data is located; and the next page adjacent to the first page refers to a page where the program data in a time zone adjacent to the time zone of the first page is located. The earliest time zone is the first time zone of the home of the channel where the program data is located; and the latest time zone is the last time zone of the home of the channel where the program data is located.

Taking FIG. 4 as an example, if the latest time zone of all program data is the time zone ending at "11:00", when the focus is located at the last column of the current page of the program area illustrated in FIG. 4 (the boundary of the page) and the moving direction of the focus points to the right side (the outside of the boundary of the current page), since the time zone to which "11:00" belongs is already the last time zone of all program data, at this time, it is determined that the current page is the last page in the focus moving direction indicated by the moving instruction. Therefore, the television will switch the current page to the page where the first time zone ("0:00 to 1:00") is located, and this page is the last page in the opposite direction of the focus moving direction. If the latest time zone of all program data is the time zone ending at "24:00", when the focus is located at the last column of the current page of the program area illustrated in FIG. 4 (i.e., time zone "10:30 to 11:00") and the moving direction of the focus points to the right side (the outside of the boundary of the current page), the television will switch the current page to a page where the program data in a time zone such as "11:00 to 11:30" is located.

Taking a channel area as a first area as an example, the first page which is the last page in the focus moving direction refers to a page where the last channel data among all channel data is located; the last page in the opposite direction of the focus moving direction refers to a page where the first channel data among all channel data is located; and the next page adjacent to the first page refers to a page where the channel data adjacent to the channel in the first page is located.

Still taking FIG. 4 as an example, if there are 10 channel data of the EPG and the channel numbers are "-4" to "0" and "1" to "5" displayed on the current page in FIG. 4, when the focus is located at the last row of the current page of the channel area illustrated in FIG. 4 (the boundary of the page) and the moving direction of the focus is downward (the outside of the boundary of the current page), since the channel control "5" is already the last one of all channel data, at this time, it is determined that the current page is the last page in the focus moving direction indicated by the moving instruction. Therefore, the television will switch the current page to a page where the first channel (channel "-4") is located, and this page is the last page in the opposite direction of the focus moving direction.

Taking FIG. 5 as an example, the focus is located at the last row (i.e., channel "5") of the page where the current channel data is located, the current channel data page is not the last page in the focus moving direction, and the channel data in the channel area also includes a channel "6" and channels after the channel "6". At this time, the first page is switched to a page where the channel "6" is located.

Since one favorite control in the favorite area corresponds to one piece of channel data in the channel area, when the focus moves within the favorite area, the page switching situation is similar to that when the focus moves in the channel area. Therefore, the disclosure will not describe the favorite area in detail.

It can be understood that in the present embodiment, when the moving instruction indicates that the focus moves from the current page of the first area to the outside of the boundary of the current page, whether the first page is the last page in the focus moving direction indicated by the moving instruction is also determined, and then the second page to be switched to is determined according to the determination result. By means of the method, even if the current first page is the last page, the problem of focus jump due to the inability to find the second page to be switched to still can be relieved when a moving instruction for moving the focus to the outside of the boundary of the page is received.

In one or more embodiments, the operation of determining the position of the focus in the second page includes:

the position of the upper left corner in the second page is determined as the position of the focus in the second page when the second page is a last page in an opposite direction of the focus moving direction; and the position, adjacent to a historical position of the focus in the first page, in the second page is determined as the position of the focus in the second page when the second page is a next page adjacent to the first page in the focus moving direction.

In the present embodiment, after the second page is determined, it is necessary to further determine a specific position in the second page to which the focus needs to be moved. For different pages after switching, the positions of the focus in the second page are different.

If the second page is the last page in the opposite direction of the focus moving direction, the position of the focus in the second page may be the position of the upper left corner in the second page.

In this situation, when the second page is the last page in the opposite direction of the focus moving direction, the position of the upper left corner in the second page may be directly set as the position of the focus.

If the second page is the next page adjacent to the first page in the focus moving direction, the position of the focus in the second page may be set to be the position adjacent to the historical position of the focus in the first page.

In this situation, the disclosure adopts a callback manner, that is, the second page to be switched to is determined according to the historical position of the focus in the first page and the focus moving direction indicated by the moving instruction for the first time, and after the second page is successfully drawn, the position of the focus in the second page is recalculated according to the historical position of the focus in the first page and the focus moving direction indicated by the moving instruction. In the disclosure, because of the callback, the position of the focus, which is at the boundary of the first page before switching, in the second page may be determined correctly after switching to the second page. It can be understood that this callback manner improves the accuracy of focus movement.

In one or more embodiments, the operation of switching the current page of the first area is switched from the first page to the second page includes:

the current page of the first area is switched from the first page to the second page in N steps according to a predetermined number of entries, where the second page includes M entries, and N is a positive integer less than or equal to M.

In the present embodiment, when the current page of the first area is switched from the first page to the second page, a page scrolling manner may be used. The first page is switched to the second page in N steps in the page scrolling manner, and a predetermined number of entries are scrolled in every time, so as to complete the switching from the first page to the second page.

It should be noted that one entry refers to a row of data (control) or a column of data (control) that is scrolled. For example, if the first area is the channel area, when the channel data is scrolled upward or downward, one entry includes channel data and program data corresponding to different time zones in a row direction where the channel data is located. If the first area is the program area, when the program data is scrolled leftward or rightward, one entry may include program data corresponding to all channel data in one time zone in a column direction.

Taking FIG. 5 as an example, when the focus is located on the channel "5" and a downward focus moving instruction is received, the page starts to scroll up one row, that is, scrolls a channel "6" and program data in different time zones corresponding to the channel "6". However, during scrolling, the control may not be drawn yet, and the scrolling page is empty. However, the processor of the television is still drawing the control, and after the control is successfully drawn, the control is displayed in the scrolling page immediately.

After the second page is drawn while scrolling, at this time, the corresponding control is set as a focus control in the second page based on the callback manner or by directly specifying the upper left corner.

It can be understood that in the embodiments of the disclosure, by means of page scrolling, the control may be drawn within a buffer time, thereby improving the success rate of focus movement.

In one or more embodiments, the operation that the current page of the first area is switched from the first page to the second page when the moving instruction instructs the focus to move from the current page of the first area to the outside of the boundary of the current page includes:

the focus is moved to an outermost control when the moving instruction instructs the focus to move from the current page of the first area to the outside of the boundary of the current page, where the outermost control includes a frame control surrounding multiple functional areas of the EPG;

the second page is drawn during moving the focus to the outermost control; and the current page of the first area is switched from the first page to the second page upon completion of drawing of the second page.

In the present embodiment, when the current page of the first area is switched from the first page to the second page, a manner of temporarily transferring the focus to the outermost control is used. The outermost control is a frame control surrounding multiple functional areas of the EPG, namely a frame control surrounding the program area, the channel area and the favorite area. It should be noted that in the embodiments of the disclosure, on a display interface of the EPG, the outermost frame control is a control that is fixed when an original interface is drawn, and will not change because of the switching of the channel data page or the switching of the program data page. Thus, when the moving instruction instructs the focus to move from the current page of the first area to the outside of the boundary of the current page, the television may place the focus on the existing frame control.

Taking FIG. 2 as an example, the outermost control refers to a maximum rectangular frame, and the outermost control surrounds the favorite area, the channel area and the program area.

In the process of moving the focus to the outermost control of the display interface, the second page is drawn, and after the drawing of the second page is completed, the current first page of the first area jumps to the second page.

After the page jump is completed, at this time, the corresponding control is set as a focus control in the second page based on the callback manner or by directly specifying the upper left corner.

It can be understood that in this processing manner, the second page is drawn within the duration in which the focus is moved to the outermost control, and the success rate of focus movement may also be improved.

In one or more embodiments, the method further includes:

the focus currently located on the outermost control is moved to the determined position in the second page after switching to the second page.

In the present embodiment, because the focus is currently located on the outermost control and is no longer within the first area, it is necessary to point a path for obtaining the focus to the second page of the first area again. After the path for obtaining the focus is pointed to the second page, the corresponding control may be set as the focus control in the second page based on the callback manner or by directly specifying the upper left corner.

It can be understood that in the disclosure, the first area where the focus is located on the display interface of the EPG is determined, whether a focus cross-area jump condition is satisfied is determined when a moving instruction for the focus is detected, and the focus is limited to move within the first area when the focus cross-area jump condition is not satisfied. When the moving instruction for the focus by a user is detected, the focus may be limited not to jump into an area other than the first area, therefore, the phenomenon of focus jump may be relieved, and the use experience may be improved.

Figure 6:
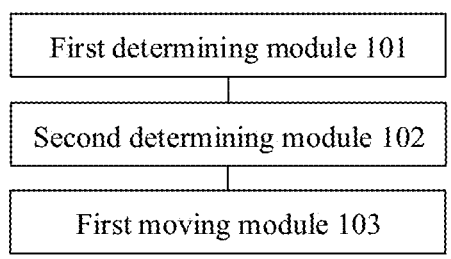
FIG. 6 is a diagram of a device for loading an EPG according to an embodiment.

FIG. 6 is a diagram of a device for loading an EPG according to an embodiment. Referring to FIG. 6, the device for loading an EPG includes a first determining module 101, a second determining module 102, and a first moving module 103.

The first determining module 101 is configured to determine a first area where a focus is located on a display interface of the EPG, where the first area is one of multiple functional display areas of the EPG.

The second determining module 102 is configured to determine whether a focus cross-area jump condition is satisfied in response to detecting a moving instruction for the focus.

The first moving module 103 is configured to limit the focus to move within the first area in response to determining that the focus cross-area jump condition is not satisfied. The moving module 103 may include one or more processors.

Optionally, the first moving module 103 is specifically configured to switch the current page of the first area from the first page to the second page when the moving instruction instructs the focus to move from the current page of the first area to the outside of the boundary of the current page; and determine the position of the focus in the second page.

Optionally, the first moving module 103 is specifically configured to determine whether the first page is the last page in the focus moving direction indicated by the moving instruction when the moving instruction instructs the focus to move from the current page of the first area to the outside of the boundary of the current page; switch the first page to a last page in an opposite direction of the focus moving direction when the first page is the last page in the focus moving direction; and switch the first page to a next page adjacent to the first page in the focus moving direction when the first page is not the last page in the focus moving direction.

Optionally, the first moving module 103 is specifically configured to determine the position of the upper left corner in the second page as the position of the focus in the second page when the second page is a last page in an opposite direction of the focus moving direction; and determine the position, adjacent to the historical position of the focus in the first page, in the second page as the position of the focus in the second page when the second page is the next page adjacent to the first page in the focus moving direction.

Optionally, the first moving module 103 is specifically configured to switch the current page of the first area from the first page to the second page in N steps according to a predetermined number of entries, where the second page includes M entries, and N is a positive integer less than or equal to M.

Optionally, the first moving module 103 is specifically configured to move the focus to an outermost control when the moving instruction instructs the focus to move from the current page of the first area to the outside of the boundary of the current page, where the outermost control includes a frame control surrounding the multiple functional areas of the EPG; draw the second page during moving the focus to the outermost control; and switch the current page of the first area from the first page to the second page upon completion of drawing of the second page.

Optionally, the device further includes:

a second moving module 104, configured to move the focus currently located on the outermost control to the determined position in the second page after switching to the second page.

Optionally, the device further includes a capturing module 105 and a third determining module 106.

The capturing module 105 is configured to capture a target focus position in the first page according to the position of the focus in the first page and the focus moving direction indicated by the moving instruction.

The third determining module 106 is configured to determine that the moving instruction instructs the focus to move from the current page of the first area to the outside of the boundary of the current page in response to that no target focus position is captured in the first page.

Optionally, the first moving module 103 is configured to set a second area to a disabled state, where the second area in the disabled state may not obtain the focus, and the second area is an area other than the first area in the display interface of the EPG.

With respect to the device in the above embodiment, the specific manners for performing operations for individual modules therein have been described in detail in the embodiment regarding the method, which will not be elaborated herein.

Figure 7:
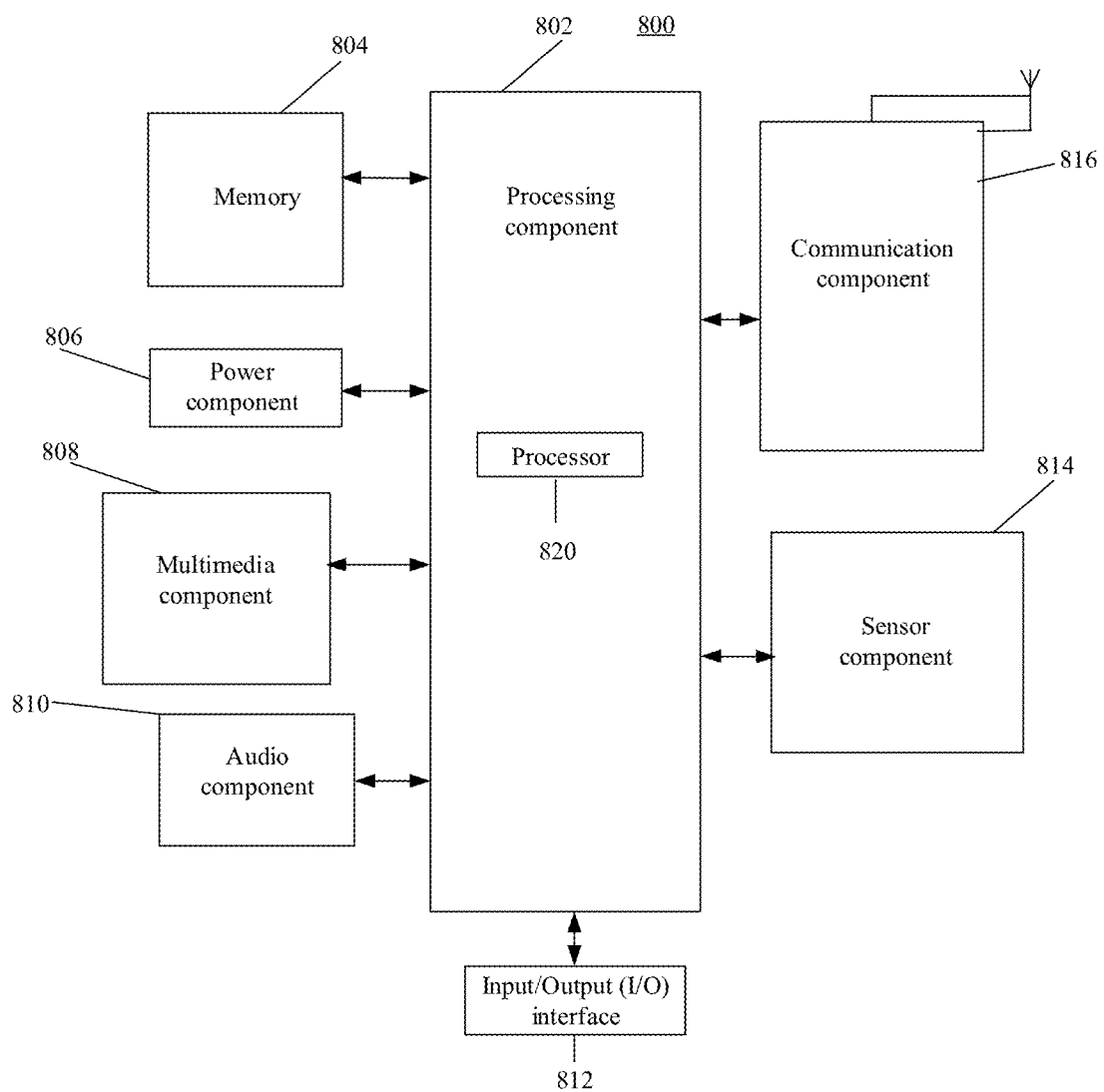
FIG. 7 is a block diagram of a display device according to an embodiment of the disclosure.

FIG. 7 is a block diagram of a display device 800 according to an embodiment. For example, the device 800 may be a smart TV, and the like.

Referring to FIG. 7, the device 800 may include one or multiple the following components: a processing component 802, a memory 804, a power supply component 806, a multimedia component 808, an audio component 810, an Input/Output (I/O) interface 812, a sensor component 814 and a communication component 816.

The processing component 802 generally controls the overall operations of the device 800, such as operations associated with display, telephone call, data communication, camera operation and recording operation. The processing component 802 may include one or multiple processors 820 to execute instructions to complete all or part of the steps of the method described above. In addition, the processing component 802 may include one or multiple modules to facilitate the interaction between the processing component 802 and other components. For example, the processing component 802 may include a multimedia module to facilitate the interaction between the multimedia component 808 and the processing component 802.

The memory 804 is configured to store various types of data to support operations at the device 800. Examples of the data include instructions of any application or method operated on the device 800, contact data, phonebook data, messages, pictures, videos, and the like. The memory 804 may be implemented using any type of volatile or nonvolatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power supply component 806 supplies power to various components of the device 800. The power component 806 may include a power management system, one or more power sources, and any other components associated with the generation, management, and distribution of power for the device 800.

The multimedia component 808 includes a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 808 includes a front camera and/or a rear camera. The front camera and/or the rear camera may receive external multimedia data when the device 800 is in an operation mode, such as a photographing mode or a video mode. Each front camera and each rear camera may be fixed optical lens systems or may have focal lengths and optical zoom capabilities.

The audio component 810 is configured to output and/or input audio signals. For example, the audio component 810 includes a microphone (MIC) configured to receive external audio signals when the device 800 is in an operation mode, such as a call mode, a recording mode and a voice recognition mode. The received audio signals may be further stored in the memory 804 or sent via the communication component 816. In some embodiments, the audio component 810 further includes a speaker configured to output audio signals.

The I/O interface 812 provides an interface between the processing component 802 and a peripheral interface module. The peripheral interface module may be a keyboard, a click wheel, buttons, etc. These buttons may include, but not limited to: a home button, a volume button, a start button, and a lock button.

The sensor component 814 includes one or multiple sensors configured to provide various aspects of state evaluation for the device 800. For example, the sensor component 814 may detect an open/closed state of the device 800, and relative positioning of components. For example, the components are the display and the keypad of the device 800. The sensor component 814 may also detect a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the existence of nearby objects under the situation of no physical contact. The sensor component 814 may also include an optical sensor, such as a CMOS or CCD image sensor, for use in imaging applications. In some embodiments, the sensor component 814 may further include an acceleration sensor, a gyroscope sensor, a magnetic sensor, a pressure sensor, or a temperature sensor.

The communication component 816 is configured to facilitate wired or wireless communication between the device 800 and other devices. The device 800 may access to wireless networks based on communication standards, such as Wi-Fi, 2G or 3G, or a combination thereof. In some embodiments, the communication component 816 receives broadcast signals or broadcast related information from an external broadcast management system via a broadcast channel. In some embodiments, the communication component 816 further includes a Near Field Communication (NFC) module to facilitate short-range communications. For example, the NFC module may be implemented based on a Radio Frequency Identification (RFID) technology, an Infrared Data Association (IrDA), an Ultra-Wide Band (UWB) technology, a Bluetooth (BT) technology and other technologies.

In some embodiments, the device 800 may be implemented by one or multiple an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor or other electronic elements for executing the method described above.

In some embodiments, the disclosure further provides a non-transitory computer-readable storage medium including instructions, such as the memory 804 including instructions. The instructions may be executed by the processor 820 of the device 800 to complete the above method. For example, the non-transitory computer-readable storage medium may be a ROM, a RAM, a Compact Disc Read-Only Memory (CD-ROM), a magnetic tape, a soft disk, an optical data storage device or the like.

A non-transitory computer-readable storage medium is provided. When an instruction in the storage medium is executed by a processor of a terminal, the terminal may execute the control method. The method includes:

a first area where a focus is located on a display interface of the EPG is determined, where the first area is one of multiple functional display areas of the EPG;

whether a focus cross-area jump condition is satisfied is determined when a moving instruction for the focus is detected; and the focus is limited to move in the first area if the focus cross-area jump condition is not met.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module,"

"circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Those skilled in the art will easily think of other implementation solutions of the disclosure after considering the specification and practicing the invention disclosed here. The disclosure is intended to cover any variations, uses, or adaptive changes of the disclosure. These variations, uses, or adaptive changes follow the general principles of the disclosure and include common general knowledge or conventional technical means in the technical field, which are not disclosed herein. The specification and the embodiments are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

What is claimed is:

1. A method for loading an electronic program guide (EPG), comprising:
   determining, by a smart television, a first area where a focus is located on a display interface of an EPG, wherein the first area is one of a plurality of functional display areas of the EPG;
   determining, by the smart television, whether a focus cross-area jump condition is satisfied in response to detecting a moving instruction for moving the focus on the display interface of the EPG; and
   limiting, by the smart television, the focus to move within the first area in response to determining that the focus cross-area jump condition is not satisfied,
   wherein limiting the focus to move within the first area comprises:
   switching a current page of the first area from a first page to a second page when the moving instruction instructs the focus to move from the current page of the first area to outside of a boundary of the current page; and
   determining a position of the focus in the second page,
   wherein switching the current page of the first area from the first page to the second page when the moving instruction instructs the focus to move from the current page of the first area to the outside of the boundary of the current page comprises:
   moving the focus to an outermost control when the moving instruction instructs the focus to move from the current page of the first area to the outside of the boundary of the current page, wherein the outermost control comprises a frame control surrounding the plurality of functional areas of the EPG;
   drawing the second page during moving the focus to the outermost control; and
   switching the current page of the first area from the first page to the second page upon completion of drawing of the second page.

2. The method of claim 1, wherein switching the current page of the first area from the first page to the second page when the moving instruction instructs the focus to move from the current page of the first area to the outside of the boundary of the current page comprises:
   determining whether the first page is a first end page in a focus moving direction indicated by the moving instruction when the moving instruction instructs the focus to move from the current page of the first area to the outside of the boundary of the current page;
   switching the first page to a second end page in an opposite direction of the focus moving direction in response to determining that the first page is the first end page in the focus moving direction; and
   switching the first page to a next page adjacent to the first page in the focus moving direction in response to determining that the first page is not the first end page in the focus moving direction.

3. The method of claim 2, wherein determining the position of the focus in the second page comprises:
   determining an upper left corner position in the second page as the position of the focus in the second page when the second page is the second end page in the opposite direction of the focus moving direction; and
   determining a position, adjacent to a historical position of the focus in the first page, in the second page as the position of the focus in the second page when the second page is the next page adjacent to the first page in the focus moving direction.

4. The method of claim 1, wherein switching the current page of the first area from the first page to the second page comprises:
   switching the current page of the first area from the first page to the second page in N steps according to a predetermined number of entries, wherein the second page comprises M entries, and N is a positive integer less than or equal to M.

5. The method of claim 1, wherein the method further comprises:
   moving the focus currently located on the outermost control to the determined position in the second page after switching to the second page.

6. The method of claim 1, wherein the method further comprises:
   capturing a target focus position in the first page according to a position of the focus in the first page and a focus moving direction indicated by the moving instruction; and
   determining that the moving instruction instructs the focus to move from the current page of the first area to the outside of the boundary of the current page in response to that no target focus position is captured in the first page.

7. The method of claim 1, wherein limiting the focus to move within the first area comprises:
   setting a second area to a disabled state, wherein the second area in the disabled state cannot obtain the focus, and the second area is an area other than the first area in the display interface of the EPG.

8. A device for loading an electronic program guide (EPG), comprising:
   one or more processors, and
   a memory configured to store instructions executable by the one or more processors,
   wherein the one or more processors are configured to:
   determine a first area where a focus is located on a display interface of an EPG, wherein the first area is one of a plurality of functional display areas of the EPG;
   determine whether a focus cross-area jump condition is satisfied in response to detecting a moving instruction for moving the focus on the display interface of the EPG; and limit the focus to move within the first area in response to determining that the focus cross-area jump condition is not satisfied, wherein the one or more processors are configured to:

switch a current page of the first area from a first page to a second page when the moving instruction instructs the focus to move from the current page of the first area to outside of a boundary of the current page; and determine a position of the focus in the second page, wherein the one or more processors are configured to:

move the focus to an outermost control when the moving instruction instructs the focus to move from the current page of the first area to the outside of the boundary of the current page, wherein the outermost control comprises a frame control surrounding the plurality of functional areas of the EPG;

draw the second page during moving the focus to the outermost control; and switch the current page of the first area from the first page to the second page upon completion of drawing of the second page.

9. The device of claim 8, wherein the one or more processors are configured to:

determine whether the first page is a first end page in a focus moving direction indicated by the moving instruction when the moving instruction instructs the focus to move from the current page of the first area to outside of the boundary of the current page;

switch the first page to a second end page in an opposite direction of the focus moving direction in response to determining that the first page is the first end page in the focus moving direction; and switch the first page to a next page adjacent to the first page in the focus moving direction in response to determining that the first page is not the first end page in the focus moving direction.

10. The device of claim 9, wherein the one or more processors are configured to:

determine an upper left corner position in the second page as the position of the focus in the second page when the second page is the second page in the opposite direction of the focus moving direction; and determine a position, adjacent to a historical position of the focus in the first page, in the second page as the position of the focus in the second page when the second page is the next page adjacent to the first page in the focus moving direction.

11. The device of claim 8, wherein the one or more processors are configured to:

switch the current page of the first area from the first page to the second page in N steps according to a predetermined number of entries, wherein the second page comprises M entries, and N is a positive integer less than or equal to M.

12. The device of claim 8, wherein the processor is further configured to:

move the focus currently located on the outermost control to the determined position in the second page after switching to the second page.

13. The device of claim 8, wherein the processor is further configured to:

capture a target focus position in the first page according to a position of the focus in the first page and a focus moving direction indicated by the moving instruction; and determine that the moving instruction instructs the focus to move from the current page of the first area to the outside of the boundary of the current page in response to that no target focus position is captured in the first page.

14. The device of claim 8, wherein the processor is configured to:

set a second area to a disabled state, wherein the second area in the disabled state cannot obtain the focus, and the second area is an area other than the first area in the display interface of the EPG.

15. A non-transitory computer-readable storage medium having stored therein instructions that, when executed by a processor of a computer, cause the computer to perform operations comprising:

determining a first area where a focus is located on a display interface of an EPG, wherein the first area is one of a plurality of functional display areas of the EPG;

determining whether a focus cross-area jump condition is satisfied in response to detecting a moving instruction for moving the focus on the display interface of the EPG; and limiting the focus to move within the first area in response to determining that the focus cross-area jump condition is not satisfied, wherein limiting the focus to move within the first area comprises:

switching a current page of the first area from a first page to a second page when the moving instruction instructs the focus to move from the current page of the first area to outside of a boundary of the current page; and determining a position of the focus in the second page, wherein switching the current page of the first area from the first page to the second page when the moving instruction instructs the focus to move from the current page of the first area to the outside of the boundary of the current page comprises:

moving the focus to an outermost control when the moving instruction instructs the focus to move from the current page of the first area to the outside of the boundary of the current page, wherein the outermost control comprises a frame control surrounding the plurality of functional areas of the EPG;

drawing the second page during moving the focus to the outermost control; and switching the current page of the first area from the first page to the second page upon completion of drawing of the second page.

16. The non-transitory computer-readable storage medium of claim 15, wherein switching the current page of the first area from the first page to the second page when the moving instruction instructs the focus to move from the current page of the first area to the outside of the boundary of the current page comprises:

determining whether the first page is a first end page in a focus moving direction indicated by the moving instruction when the moving instruction instructs the focus to move from the current page of the first area to the outside of the boundary of the current page;

switching the first page to a second end page in an opposite direction of the focus moving direction in response to determining that the first page is the first end page in the focus moving direction; and switching the first page to a next page adjacent to the first page in the focus moving direction in response to determining that the first page is not the first end page in the focus moving direction.

17. The non-transitory computer-readable storage medium of claim 16, wherein determining the position of the focus in the second page comprises:
- determining an upper left corner position in the second page as the position of the focus in the second page when the second page is the second end page in the opposite direction of the focus moving direction; and
- determining a position, adjacent to a historical position of the focus in the first page, in the second page as the position of the focus in the second page when the second page is the next page adjacent to the first page in the focus moving direction.

18. The non-transitory computer-readable storage medium of claim 15, wherein switching the current page of the first area from the first page to the second page comprises:
- switching the current page of the first area from the first page to the second page in N steps according to a predetermined number of entries, wherein the second page comprises M entries, and N is a positive integer less than or equal to M.

19. The non-transitory computer-readable storage medium of claim 15, wherein the operations further comprise:
- moving the focus currently located on the outermost control to the determined position in the second page after switching to the second page.

20. The non-transitory computer-readable storage medium of claim 15, wherein the operations further comprise:
- capturing a target focus position in the first page according to a position of the focus in the first page and a focus moving direction indicated by the moving instruction; and
- determining that the moving instruction instructs the focus to move from the current page of the first area to the outside of the boundary of the current page in response to that no target focus position is captured in the first page.

* * * * *